(12) United States Patent
Tsubone et al.

(10) Patent No.: US 8,991,476 B2
(45) Date of Patent: Mar. 31, 2015

(54) THERMAL STORAGE DEVICE

(75) Inventors: Kenji Tsubone, Susono (JP); Seiichi Hashi, Tokyo (JP); Masahito Tsukahara, Tokyo (JP); Masataka Fukuzawa, Tokyo (JP); Kouji Narita, Tokyo (JP)

(73) Assignees: Toyota Jidosha Kabushiki Kaisha, Toyota-shi, Aichi (JP); T.Rad Co., Ltd., Tokyo (JP)

( * ) Notice: Subject to any disclaimer, the term of this patent is extended or adjusted under 35 U.S.C. 154(b) by 1348 days.

(21) Appl. No.: 12/525,345

(22) PCT Filed: Jan. 31, 2008

(86) PCT No.: PCT/JP2008/051980
§ 371 (c)(1),
(2), (4) Date: Jan. 29, 2010

(87) PCT Pub. No.: WO2008/093887
PCT Pub. Date: Aug. 7, 2008

(65) Prior Publication Data
US 2010/0126706 A1    May 27, 2010

(30) Foreign Application Priority Data

Feb. 1, 2007 (JP) .................................. 2007-023206

(51) Int. Cl.
*F28D 17/00* (2006.01)
*F28D 15/00* (2006.01)
*F28D 20/00* (2006.01)

(52) U.S. Cl.
CPC .... *F28D 20/0039* (2013.01); *F28D 2020/0078* (2013.01); *F28D 2020/0086* (2013.01);
(Continued)

(58) Field of Classification Search
USPC .............. 165/10, 11, 104.11, 104.13, 104.14, 165/104.19
See application file for complete search history.

(56) References Cited

U.S. PATENT DOCUMENTS 2,886,746 A * 5/1959 Saby .............................. 257/715
3,406,244 A * 10/1968 Oktay .......................... 174/15.1
(Continued)

FOREIGN PATENT DOCUMENTS

CN   1229594   11/2005
DE   32 26 461   1/1984
(Continued)

OTHER PUBLICATIONS

German Office Action for German Appl. No. 11 2008 000 316.5-16 dated Apr. 19, 2011.

*Primary Examiner* — Alexandra Elve
*Assistant Examiner* — Henry Crenshaw
(74) *Attorney, Agent, or Firm* — Finnegan, Henderson, Farabow, Garrett & Dunner, LLP

(57) ABSTRACT

An objective of the present invention is to store heat into a thermal storing material using a plurality of thermal transport mediums, in a thermal storage device utilizing natural convection of a thermal storage material resulting from temperature difference of the thermal storage material.

The thermal storage device of the invention has a plurality of thermal transport mediums 6a and 6b having different temperatures, a thermal storage material 2 which stores heat of the thermal transport mediums 6a and 6b or whose heat is drawn by the thermal transport mediums 6a and 6b, a thermal storage portion 1 accommodating the thermal storage material 2, and a first and a second thermal storage tanks 3 and 4 formed by dividing an inner space of the thermal storage portion 1, and a thermal exchange between the thermal transport medium 6a or 6b and the thermal storage material 2 takes place in the individual thermal storage tanks. In order to achieve the above-mentioned objective, the thermal storage device of the present invention is characterized by comprising: inner tanks 5a and 5b, which is formed in at least one of the first and the second thermal storage tanks 3 and 4, and in which a side thereof opposite to a boundary between the thermal storage tanks 3 and 4 is open; and a thermal exchange portion 8a and 8b formed inside of the inner tanks 5a and 5b, at which thermal exchange takes place between the thermal transport medium 6a or 6b and the thermal storage material 2.

2 Claims, 6 Drawing Sheets

(52) U.S. Cl.
CPC ............ *Y02E 60/142* (2013.01); *F28F 2270/00* (2013.01)
USPC ..... 165/10; 165/11; 165/104.11; 165/104.13; 165/104.14; 165/104.19

(56) References Cited

U.S. PATENT DOCUMENTS

| | | | | |
|---|---|---|---|---|
| 3,626,080 | A * | 12/1971 | Pierce | 174/15.1 |
| 3,817,322 | A * | 6/1974 | Asselman et al. | 165/104.26 |
| 3,965,972 | A * | 6/1976 | Petersen | 165/45 |
| 4,086,958 | A * | 5/1978 | Lindner et al. | 165/10 |
| 4,119,143 | A * | 10/1978 | Robinson, Jr. | 165/10 |
| 4,158,384 | A * | 6/1979 | Brautigam | 165/236 |
| 4,166,449 | A * | 9/1979 | Depew | 126/400 |
| 4,182,409 | A * | 1/1980 | Robinson, Jr. | 165/104.14 |
| 4,219,072 | A * | 8/1980 | Barlow, Sr. | 165/276 |
| 4,219,076 | A * | 8/1980 | Robinson, Jr. | 165/104.14 |
| 4,299,275 | A * | 11/1981 | Robinson, Jr. | 165/104.14 |
| 4,366,807 | A * | 1/1983 | Barber, Jr. | 126/639 |
| 4,371,028 | A * | 2/1983 | Helshoj | 165/10 |
| 4,550,771 | A * | 11/1985 | Arbabian | 165/47 |
| 4,572,286 | A * | 2/1986 | Fujii et al. | 165/104.29 |
| 4,609,036 | A * | 9/1986 | Schrader | 165/10 |
| 4,643,212 | A * | 2/1987 | Rothrock | 137/1 |
| 5,806,583 | A * | 9/1998 | Suzuki et al. | 165/104.33 |
| 5,944,089 | A * | 8/1999 | Roland | 165/10 |
| 6,672,370 | B2 * | 1/2004 | Searls et al. | 165/10 |
| 2001/0047859 | A1 * | 12/2001 | Ishida et al. | 165/104.14 |
| 2004/0182088 | A1 * | 9/2004 | Ghoshal et al. | 62/3.7 |
| 2005/0145370 | A1 * | 7/2005 | Merryfull | 165/104.19 |

FOREIGN PATENT DOCUMENTS

| | | |
|---|---|---|
| DE | 197 10 803 | 9/1998 |
| JP | 53-153548 | 12/1978 |
| JP | 55-59221 | 4/1980 |
| JP | 60-256796 | 12/1985 |
| JP | 61-161396 | 7/1986 |
| JP | 1-200135 | 8/1989 |
| JP | 04-320795 | 11/1992 |
| JP | 2003-336974 | 11/2003 |

* cited by examiner

THERMAL STORAGE DEVICE

CROSS-REFERENCE TO RELATED APPLICATIONS

This application is a national phase application of International Application No. PCT/JP2008/051980, filed Jan. 31, 2008, and claims the priority of Japanese Application No. 2007-023206, filed Feb. 1, 2007, the contents of both of which are incorporated herein by reference.

TECHNICAL FIELD

This invention relates to a thermal storage device for storing thermal energy, which comprises a plurality of heat transport mediums flowing through a heat storage material.

BACKGROUND ART

A heat exchanger such as a heat accumulator and a cold storage device for exchanging thermal energy between thermal transport mediums having integrated porous tubes formed in a thermal storage material is known in the art. In the heat exchanger of this kind, a heat source fluid and a hear recovery fluid flow individually in the porous tubes. One example of the heat exchanger of this kind is disclosed in Japanese Patent Laid-Open No. 2003-336974. In the heat exchanger taught by Japanese Patent Laid-Open No. 2003-336974, a plurality of flow passages are arranged in the heat storage material at regular intervals.

Specifically, in the heat exchanger taught by Japanese Patent Laid-Open No. 2003-336974, each flow passage is a porous tube flowing the heat source fluid and the hear recovery fluid individually. Those tubes are arranged between first and second tanks and individually communicated with those tanks, and the heat storage material is filled outside of the tubes. Therefore, in case a temperature of the heat storage material rises during a process of storing the heat while flowing the plurality of heat source fluids of different temperatures in the flow passages, the temperature of the heat storage material around a portion of the flow passage through which the heat source fluid of lower temperature is flowing and the temperature of the heat source fluid of lower temperature itself may be assimilated, or those temperatures may be inverted. Therefore, a heat accumulation from the heat source fluid of lower temperature to the heat storage material may be hindered.

DISCLOSURE OF THE INVENTION

The present invention has been conceived noting the technical problems thus far described, and its object is to improve thermal storing efficiency during a process of storing heat or cold from a plurality of thermal transport medium into a thermal storage material or a cold storage material.

In order to achieve the above-mentioned object, according to the present invention, there is provided a thermal storage device, which has a plurality of thermal transport mediums having different temperatures, a thermal storage material which stores heat of the thermal transport mediums or whose heat is drawn by the thermal transport mediums, a thermal storage portion accommodating the thermal storage material, and a first and a second thermal storage tanks formed by dividing an inner space of the thermal storage portion, and in which a thermal exchange between the thermal transport medium and the thermal storage material takes place in the individual thermal storage tanks, characterized by comprising: an inner tank, which is formed in at least one of the first and the second thermal storage tanks, and in which a side thereof opposite to a boundary between the thermal storage tanks is open; and a thermal exchange portion, which is formed inside of the inner tank, and in which a thermal exchange takes place between the thermal transport medium and the thermal storage material.

The thermal storage device of the present invention further comprises a flow passage formed outside of the inner tank, through which the thermal storage material flows.

According to the present invention, the thermal storage material is allowed to flow into the first and the second thermal storage tanks bilaterally.

In addition, according to the present invention, the thermal exchange takes place between the thermal storage material in the first thermal storage tank and the thermal storage material in the second thermal storage tank through a partition wall formed on a boundary between the first and the second thermal storage tanks.

The thermal storage device of the present invention further comprises a discharge conduit penetrating the thermal storage tanks, and a thermal discharging medium flows therethrough. The discharge conduit comprises a thermal exchange portion at which a thermal exchange takes place between the thermal discharging medium in the discharge conduit and the thermal storage material in the thermal storage tanks.

According to the present invention, therefore, the thermal storage from the thermal transport mediums to the thermal storage material takes place inside of the inner tank. Therefore, a convection of the thermal storage material is induced inside of the inner tank. On the other hand, the thermal storage material existing between the inner tanks functions as a thermal insulation. For this reason, temperatures of the first and the second thermal storage tanks will not influence each other and this improves thermal storing efficiency in the thermal storage tanks.

As described, the flow passage is formed outside of the inner tank and the thermal storage material is allowed to flow therethrough. Therefore, in case of storing positive thermal energy, a convection of the thermal storing material is induced in the flow passage formed outside of the inner tank when a temperature of the thermal storage material being convected within the inner tank while storing the heat is raised higher than a predetermined temperature. To the contrary, in case of drawing heat from the thermal storage material, a convection of the thermal storage material is induced in the flow passage formed outside of the inner tank when the temperature of the thermal storage material being convected within the inner tank while being cooled is lowered below the predetermined temperature. For this reason, an amount of the thermal energy to be stored in the thermal storage device can be increased.

In addition to the above-explained advantage, according to the present invention, the thermal storage material is allowed to flow into the first and the second thermal storage tanks bilaterally. Therefore, the thermal storage material flowing outside of the first or the second thermal storage tank is allowed to flow into the boundary between the first and the second thermal storage tanks. As a result, the thermal storage material is allowed to convect entirely in the thermal storage device. For this reason, an amount of the thermal energy stored into the thermal storage device from the thermal transport medium can be increased, that is, utilization efficiency of the thermal storage material accommodated in the thermal storage device is thereby improved. Moreover, in case the thermal transport medium is not transporting the heat in one of the thermal storage tanks, the thermal storage material in the thermal storage device can be utilized entirely. Therefore, an amount of the thermal energy to be stored in the thermal storage device can be increased, and utilization efficiency of the thermal storage material accommodated in the thermal storage device is thereby improved. Further, since the plurality of thermal transport mediums can be utilized effectively, the thermal storage device can be downsized and lightened, and cost of the thermal storage device can be reduced.

Still moreover, in case the amount of the thermal energy stored in the thermal storage material is small, the thermal transport medium and the thermal storage material are allowed to exchange thermal energy therebetween without being effected by the thermal transport medium of different temperature. Therefore, the thermal storing efficiency of the thermal storage material can be improved. In addition, since the thermal storing material existing in the vicinity of the boundary between the thermal storage tanks functions as a thermal insulating material, the thermal storage device can be downsized and lightened, and cost of the thermal storage device can be reduced.

Furthermore, the thermal storage device according to the present invention comprises the discharge conduit penetrating the thermal storage tanks, and the discharge conduit comprises the thermal exchange portion at which a thermal exchange takes place between the thermal discharging medium in the discharge conduit and the thermal storage material in the thermal storage tanks. Therefore, the thermal energy stored in the thermal storage tanks can be transmitted efficiently to the thermal discharging medium flowing in the discharge conduit.

BEST MODE FOR CARRYING OUT THE INVENTION

Figure 1:
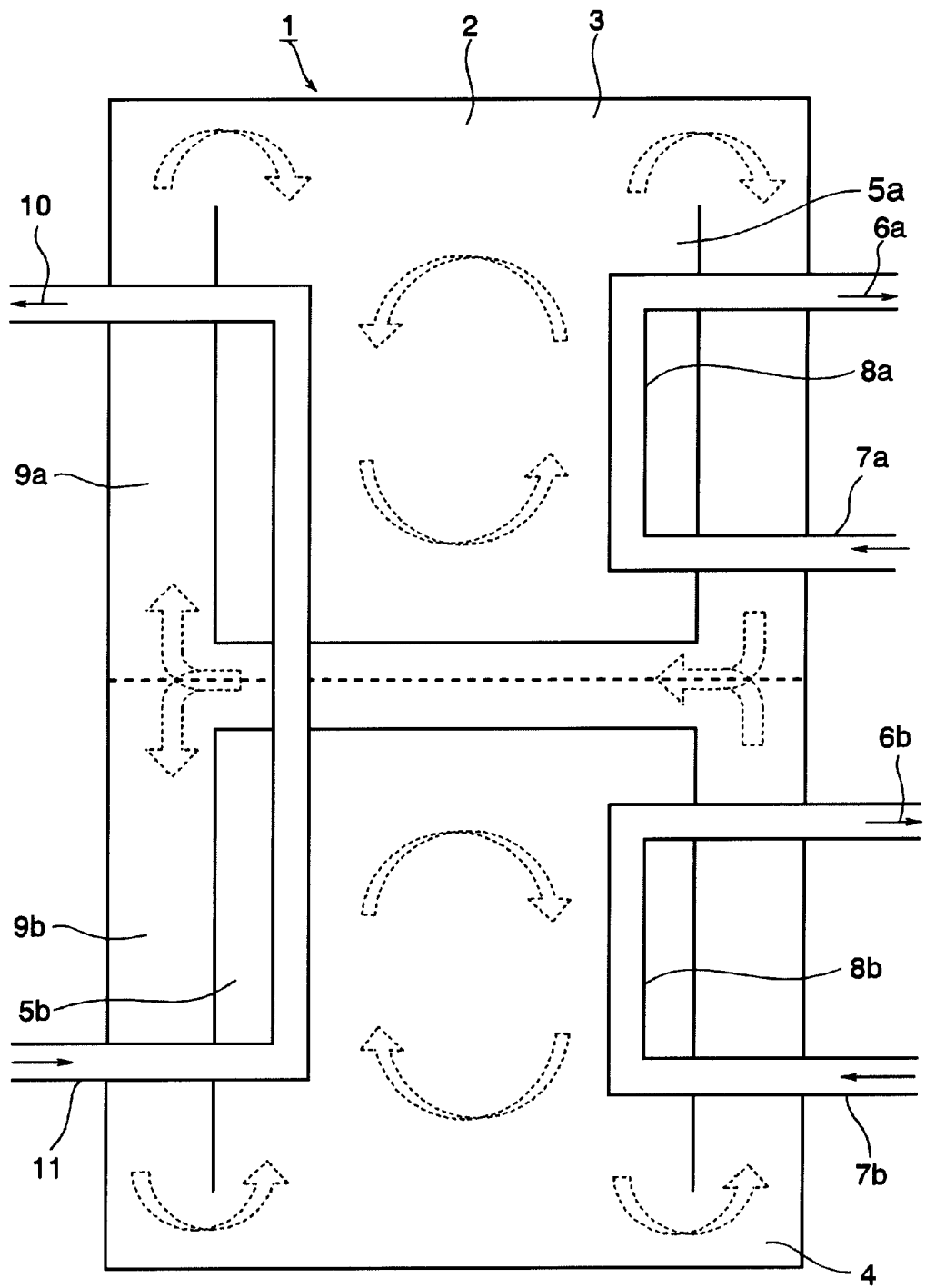
FIG. 1 is a view schematically showing a convection of the thermal storage material in one example of the thermal storage device according to the present invention.

Next, the present invention will be explained with reference to the accompanying drawings. FIG. 1 is a view schematically showing a convection of the thermal storage material in the thermal storage device of the present invention. A liquid thermal storage material 2 is held in a thermal storage portion 1, and an inner space of the thermal storage portion 1 is divided into a first thermal storage tank 3 and a second thermal storage tank 4. That is, the first thermal storage tank 3 and the second thermal storage tank 4 are adjacent to each other and the thermal storage material 2 is allowed to flow between those tanks 3 and 4.

In the first thermal storage tank 3, there is formed an inner tank 5a opening to an opposite side of a boundary between the first and the second thermal storage tanks 3 and 4. Additionally, a thermal introduction conduit 7a is formed while penetrating through the first thermal storage tank 3 and the inner tank 5a, and a thermal transport medium 6a having a temperature higher than that of the thermal storage material 2 flows through the thermal introduction conduit 7a. Therefore, thermal exchange takes place between the thermal transport medium 6a flowing through the thermal introduction conduit 7a and the thermal storage material 2. That is, the portion of the thermal introduction conduit 7a at which the thermal exchange takes place between the thermal transport medium 6a and the thermal storage material 2 functions as a thermal exchange portion 8a. As a result of such thermal exchange, a positive thermal energy is stored into the thermal storage material 2 from the thermal transport medium 6a, and a convention of the thermal storage material 2 is thereby induced in the inner tank 5a.

In the second thermal storage tank 4, there is formed an inner tank 5b opening to an opposite side of a boundary between the first and the second thermal storage tanks 3 and 4. Additionally, a thermal introduction conduit 7b is formed while penetrating through the second thermal storage tank 4 and the inner tank 5b, and a thermal transport medium 6b having a temperature higher than that of the thermal storage material 2 flows through the thermal introduction conduit 7b. Therefore, thermal exchange takes place between the thermal transport medium 6b flowing through the thermal introduction conduit 7b and the thermal storage material 2. That is, the portion of the thermal introduction conduit 7b at which the thermal exchange takes place between the thermal transport medium 6b and the thermal storage material 2 functions as a thermal exchange portion 8b. As a result of such thermal exchange, a positive thermal energy is stored into the thermal storage material 2 from the thermal transport medium 6b, and a convention of the thermal storage material 2 is thereby induced in the inner tank 5b.

As can be seen from FIG. 1, both sides of the inner tank 5a along longitudinal sides of the thermal storage portion 1, and the side of the inner tank 5a along the boundary between the first and the second thermal storage tanks 3 and 4 are closed. Therefore, a flow passage 9a for the thermal storage material 2 is formed outside of the aforementioned closed sides of the inner tank 5a in the first thermal storage tank 3. In case the thermal storage material 2 is not convecting outside of the inner tank 5a, the thermal storage material 2 existing on the boundary between the inner tanks 5a and 5b functions as a thermal insulating material between the thermal storage material 2 in the inner tank 5a and the thermal storage material 2 in the inner tank 5b.

When the heat is exchanged between the thermal storage material 2 in the inner tank 5a and the thermal transport medium 6a flowing through the thermal introduction conduit 7a, and the temperature of the thermal storage material 2 in the inner tank 5a is thereby raised higher than a predetermined temperature, a convection of the thermal storage material 2 in the inner tank 5a extends beyond the inner tank 5a thereby inducing a convection of the thermal storage material 2 outside of the closed sides of the inner tank 5a.

As also shown in FIG. 1, on the other hand, both sides of the inner tank 5b along longitudinal sides of the thermal storage portion 1, and the side of the inner tank 5b along the boundary between the first and the second thermal storage tanks 3 and 4 are closed. Therefore, a flow passage 9b for the thermal storage material 2 is formed outside of the aforementioned closed sides of the inner tank 5b in the second thermal storage tank 4. In case the thermal storage material 2 is not convecting outside of the inner tank 5b, the thermal storage material 2 existing on the boundary between the inner tanks 5a and 5b functions as a thermal insulating material between the thermal storage materials 2 in the inner tank 5a and the thermal storage materials 2 in the inner tank 5b.

As the case of the inner tank 5a, when the heat is exchanged between the thermal storage material 2 in the inner tank 5b and the thermal transport medium 6b flowing through the thermal introduction conduit 7b, and the temperature difference of the thermal storage material 2 in the inner tank 5b is thereby widened, a convection of the thermal storage material 2 in the inner tank 5b extends beyond the inner tank 5b thereby inducing a convection of the thermal storage material 2 outside of the closed sides of the inner tank 5b. Specifically, the thermal storage material 2 of the high temperature portion convects upwardly, and the thermal storage material 2 of the low temperature portion convects downwardly. Therefore, the convection of the thermal storage material 2 occurring outside of the inner tank 5b is propagated by lowering the temperature of the thermal storage material 2 in the first thermal storage tank 3 lower than that in the second thermal storage tank 4. As a result, the convection of the thermal storage material 2 goes round entirely in the thermal storage portion 1.

The thermal storage device of the present invention further comprises a thermal discharge conduit 11, and a thermal discharge medium 10 flows through the thermal discharge conduit 11. For example, in the example shown in FIG. 1, the thermal discharge conduit 11 penetrates through the longitudinal side of the thermal storage portion 1 opposite to the side in which the thermal introduction conduits 7b is situated, and further penetrates through the side face of the inner tank 5b to enter into the inner tank 5b. In the thermal storage portion 1, the thermal discharge conduit 11 extends from the inner tank 5b to enter into the other inner tank 5a across the boundary therebetween, and penetrates through the side face of the inner tank 5a and the aforementioned longitudinal side of the thermal storage portion 1 to exit from the thermal storage portion 1. Therefore, in the first and the second thermal storage tanks 3 and 4, the thermal discharge medium 10 is contacted with the thermal storage material 2 through the thermal discharge conduit 11 so that the heat is exchanged therebetween.

Figure 2:
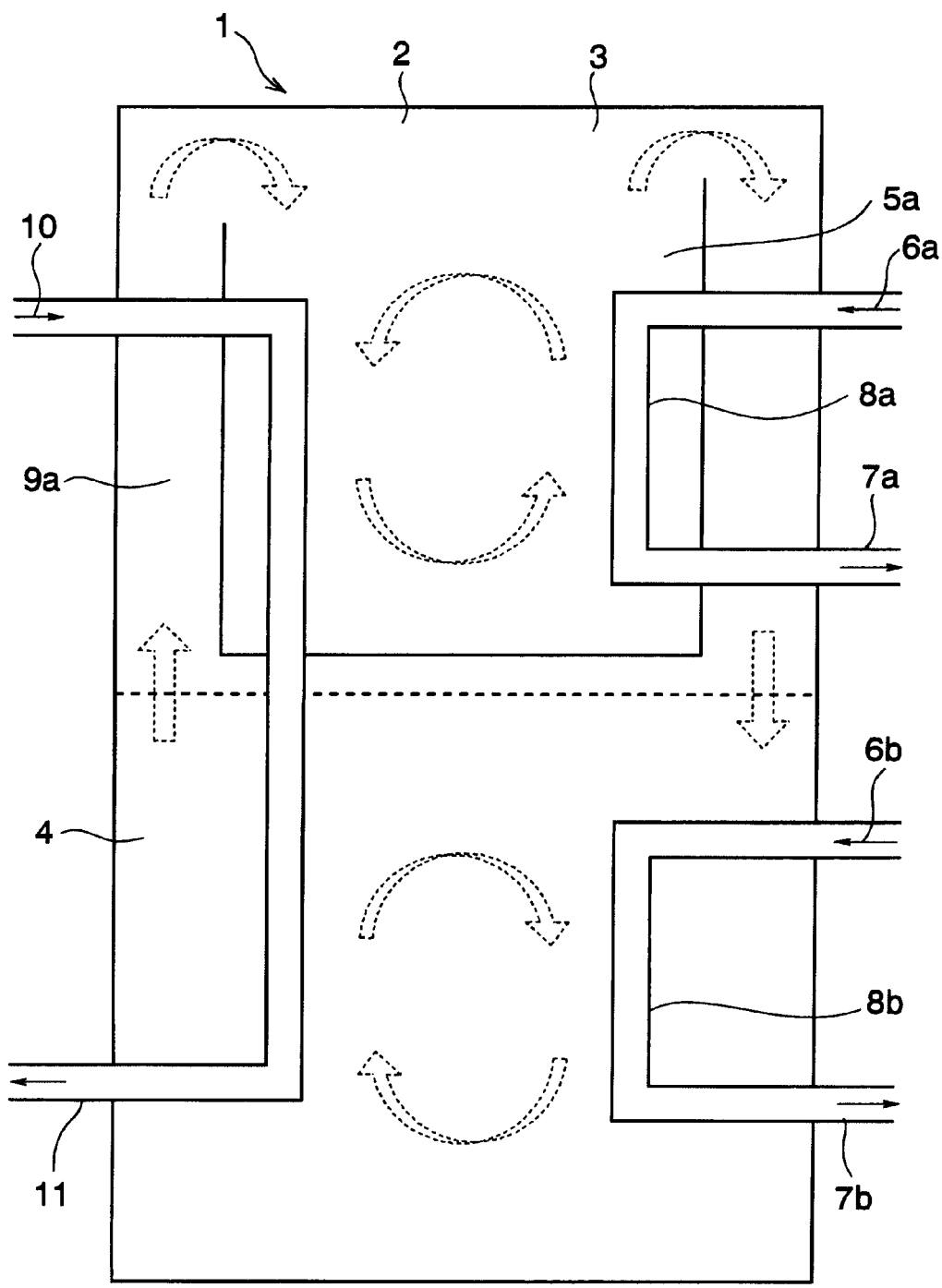
FIG. 2 is a view schematically showing a convection of the thermal storage material in another example of the thermal storage device according to the present invention.

FIG. 2 is a view schematically showing an internal configuration of the thermal storage device according to another example the present invention serving as a cooling storage device, and a convection of the thermal storage material in the thermal storage device. In this example, configuration of the first thermal storage tank 3 is identical to that of the thermal storage device shown in FIG. 1, so further explanation about the elements in common with those of the example of FIG. 1 will be omitted by allotting common reference numerals.

Likewise the example shown in FIG. 1, the thermal introduction conduit 7a penetrates through the first thermal storage tank 3 and the inner tank 5a so that a thermal exchange takes place between the thermal transport medium 6a flowing through the thermal introduction conduit 7a and the thermal storage material 2 in the inner tank 5a. However, in this example, temperature of the thermal transport medium 6a is lower than that of the thermal storage material 2. Therefore, a thermal energy of the thermal storage material 2 is absorbed by the thermal transport medium 6a and the thermal storing material 2 is thereby cooled. As a result, the thermal storage material 2 convects in the inner tank 5a.

When a temperature difference of the thermal storage material 2 becomes wider in the inner tank 5a, the convection of the thermal storage material 2 in the inner tank 5a extends beyond the inner tank 5a thereby inducing a convection of the thermal storage material 2 outside of the closed sides of the inner tank 5a. Specifically, the thermal storage material 2 of the high temperature portion convects upwardly, and the thermal storage material 2 of the low temperature portion convects downwardly. Therefore, the thermal storage material 2 outside of the inner tank 5b is convected downwardly toward the second thermal storage tank 4 by lowering the temperature of the thermal storage material 2 in the first thermal storage tank 3 lower than that in the second thermal storage tank 4. As a result, the convection of the thermal storage material 2 goes round entirely in the thermal storage tank 3 via both of the inner and outer sides of the inner tank 5a.

The thermal storage device shown in FIG. 2 also comprises the thermal introduction conduit 7b penetrating through the second thermal storage tank 4, and the portion of the thermal introduction conduit 7b being contacted with the thermal storage material 2 functions as the thermal exchange portion 8b. Therefore, thermal exchange takes place between the thermal transport medium 6b flowing through the thermal introduction conduit 7b and the thermal storage material 2. However, in this example, the temperature of the thermal transport medium 6b is lower than that of the thermal storage material 2. That is, a thermal energy of the thermal storage material 2 is absorbed by the thermal transport medium 6b, and the thermal storage material 2 is thereby cooled. As a result, convection of the thermal storage material 2 is induced in the second thermal storage tank 4. Thus, the thermal storage material 2 convects not only within the inner tank 5a but convects entirely in the thermal storage portion 1. In this situation, the thermal storage material 2 in the inner tank 5a is cooled first of all. Then, when the thermal storage material 2 in the inner tank 5a is sufficiently cooled, the thermal storage material 2 is convected entirely in the thermal storage portion 1 while being cooled. Thus, the thermal storage material 2 can be cooled efficiently all over the thermal storage portion 1.

The thermal storage device shown in FIG. 2 also comprises a thermal discharge conduit 11, and a thermal discharge medium 10 flows through the thermal discharge conduit 11. For example, in the example shown in FIG. 2, the thermal discharge conduit 11 penetrates through the longitudinal side of the thermal storage portion 1 opposite to the side in which the thermal introduction conduits 7a is situated, and further penetrates through the side face of the inner tank 5a to enter into the inner tank 5a. In the thermal storage portion 1, the thermal discharge conduit 11 extends from the inner tank 5a to enter into the second thermal storage tank 4 across the boundary therebetween, and penetrates through the aforementioned longitudinal side of the thermal storage portion 1 to exit from the thermal storage portion 1. Therefore, in the first and the second thermal storage tanks 3 and 4, the thermal discharge medium 10 is contacted with the thermal storage material 2 through the thermal discharge conduit 11 so that the heat is exchanged therebetween. As a result, the convection of the thermal storage material 2 is induced in the inner tank 5a as well as in the thermal storage tanks 3 and 4.

Figure 3:
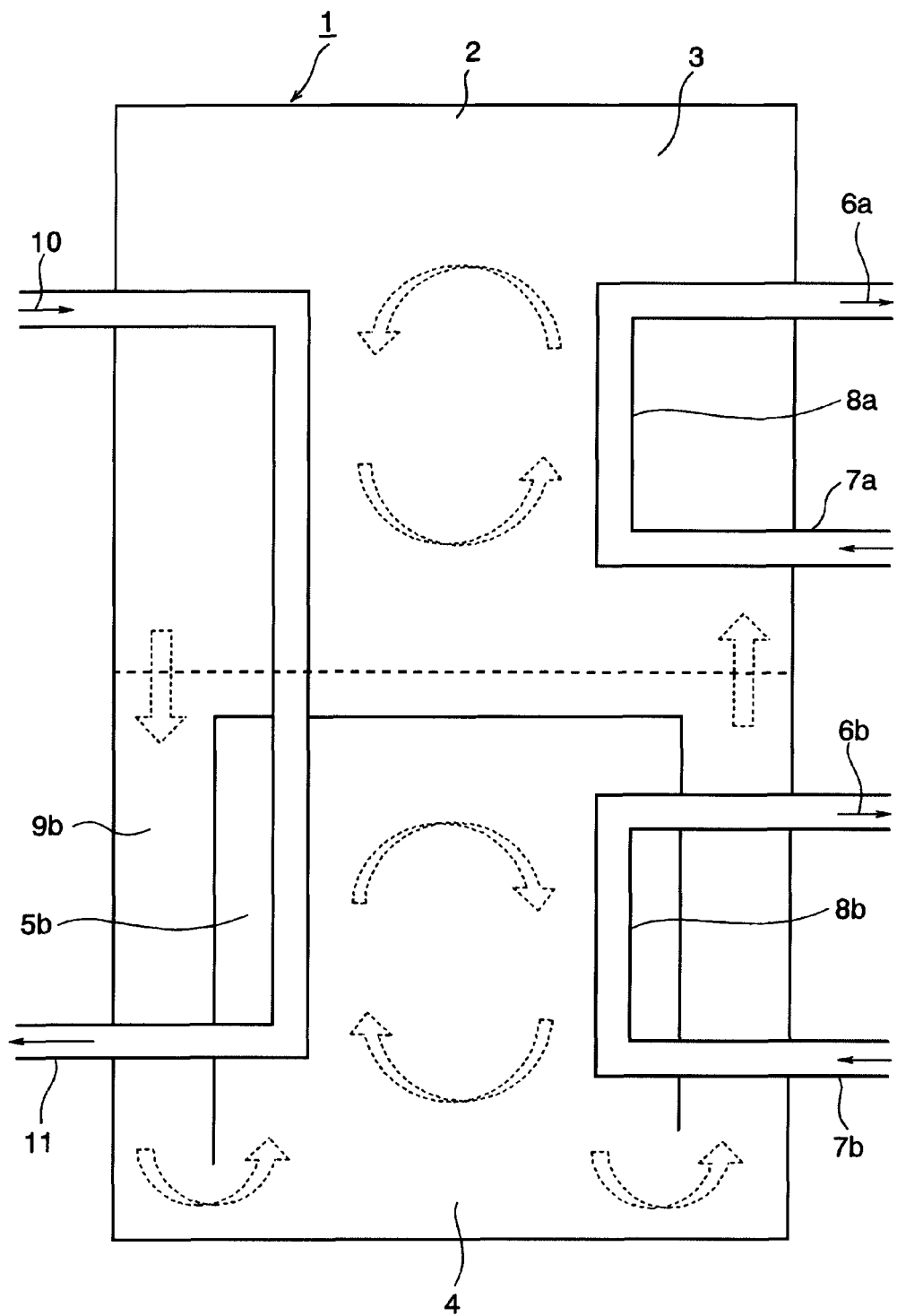
FIG. 3 is a view schematically showing a convection of the thermal storage material in another example of the thermal storage device according to the present invention.

FIG. 3 is a view schematically showing an internal configuration of the thermal storage device according to another example the present invention, and a convection of the thermal storage material in the thermal storage device. In this example, configuration of the second thermal storage tank 4 is identical to that of the thermal storage device shown in FIG.

1, so further explanation about the elements in common with those of the example of FIG. 1 will be omitted by allotting common reference numerals.

As shown in FIG. 3, the thermal introduction conduit 7a is formed to penetrate through the first thermal storage tank 3, and the thermal transport medium 6a flows through the thermal introduction conduit 7a. Therefore, thermal exchange takes place between the thermal transport medium 6a and the thermal storage material 2. Thus, the portion of the thermal introduction conduit 7a being contacted with the thermal storage material 2 functions as the thermal exchange portion 8a. In this example, the temperature of the thermal transport medium 6a is higher than that of the thermal storage material 2. Therefore, the thermal energy is stored into the thermal storage material 2 from the thermal transport medium 6a, and a convention of the thermal storage material 2 is thereby induced in the first thermal storage tank 3. As described, the thermal storage material 2 of high temperature portion convects upwardly, and the thermal storage material 2 of the low temperature portion convects downwardly. Therefore, the convection of the thermal storage material 2 is induced in the first thermal storage tank 3.

Contrary to the example shown in FIG. 2, the thermal introduction conduit 7b is formed while penetrating through the second thermal storage tank 4 and the inner tank 5b. Therefore, thermal exchange takes place between the thermal transport medium 6b flowing through the thermal introduction conduit 7b and the thermal storage material 2. In this example, the temperature of the thermal transport medium 6a is higher than that of the thermal storage material 2. Therefore, the thermal energy is stored into the thermal storage material 2 from the thermal transport medium 6b, and a convention of the thermal storage material 2 is thereby induced in the inner tank 5b.

When a temperature difference of the thermal storage material 2 becomes wider in the inner tank 5b, the convection of the thermal storage material 2 in the inner tank 5b extends beyond the inner tank 5b thereby inducing a convection of the thermal storage material 2 outside of the closed sides of the inner tank 5b. As described, the thermal storage material 2 of the high temperature portion convects upwardly, and the thermal storage material 2 of the low temperature portion convects downwardly. Therefore, the thermal storage material 2 outside of the inner tank 5b is convected upwardly toward the first thermal storage tank 3 by raising the temperature of the thermal storage material 2 in the second thermal storage tank 4 higher than that in the first thermal storage tank 3. As a result, the convection of the thermal storage material 2 goes round entirely in the thermal storage tank 3 via both of the inner and outer sides of the inner tank 5b.

The thermal storage device shown in FIG. 3 also comprises a thermal discharge conduit 11, and a thermal discharge medium 10 flows through the thermal discharge conduit 11. For example, in the example shown in FIG. 3, the thermal discharge conduit 11 penetrates through the longitudinal side of the thermal storage portion 1 opposite to the side in which the thermal introduction conduits 7a is situated to enter into the first thermal storage tank 3. In the thermal storage portion 1, the thermal discharge conduit 11 extends from the first thermal storage tank 3 to enter into the inner tank 5b in the second thermal storage tank 4 across the boundary therebetween, and penetrates through the side face of the inner tank 5b and the aforementioned longitudinal side of the thermal storage portion 1 to exit from the thermal storage portion 1. Therefore, in the first and the second thermal storage tanks 3 and 4, the thermal discharge medium 10 is contacted with the thermal storage material 2 through the thermal discharge conduit 11 so that the heat is exchanged therebetween. As a result, the convection of the thermal storage material 2 is induced in the inner tank 5b as well as in the thermal storage tanks 3 and 4.

Figure 4:
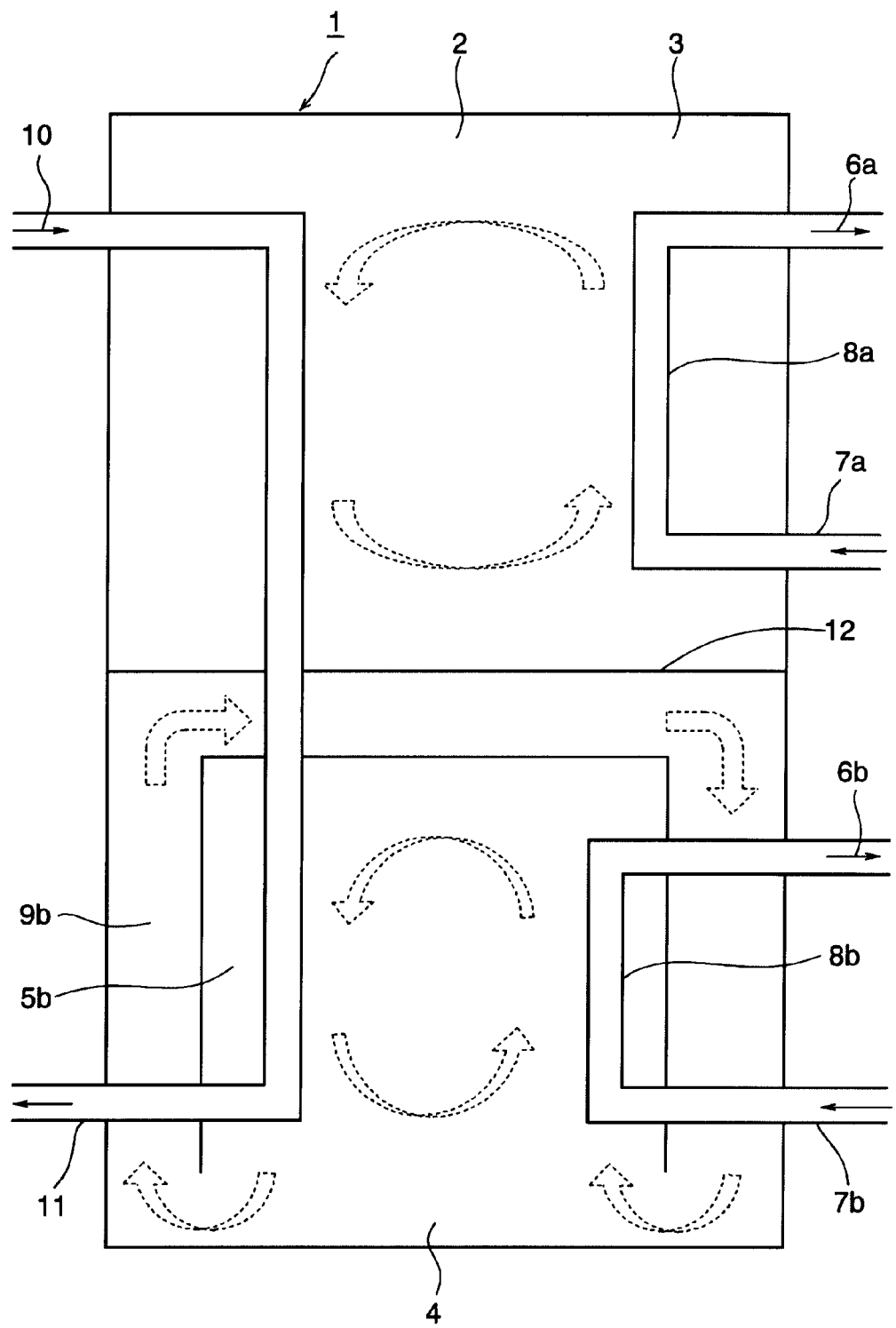
FIG. 4 is a view schematically showing a convection of the thermal storage material in still another example of the thermal storage device having a partition wall.

FIG. 4 is a view schematically showing a convection of the thermal storage material in still another example of the thermal storage device. A liquid thermal storage material 2 is held in a thermal storage portion 1, and an inner space of the thermal storage portion 1 is divided into a first thermal storage tank 3 and a second thermal storage tank 4. Specifically, a partition wall 12 is formed on the boundary between the first and the second thermal storage tanks 3 and 4 to prevent the thermal storage material 2 from flowing across the boundary.

As shown in FIG. 4, the thermal introduction conduit 7a is formed while penetrating through the first thermal storage tank 3, and the thermal transport medium 6a flows through the thermal introduction conduit 7a. Therefore, thermal exchange takes place between the thermal transport medium 6a and the thermal storage material 2. Thus, the portion of the thermal introduction conduit 7a being contacted with the thermal storage material 2 functions as the thermal exchange portion 8a. In this example, the temperature of the thermal transport medium 6a is higher than that of the thermal storage material 2. Therefore, the thermal energy is stored into the thermal storage material 2 from the thermal transport medium 6a, and a convention of the thermal storage material 2 is thereby induced in the first thermal storage tank 3.

In the second thermal storage tank 4, there is formed an inner tank 5b opening to an opposite side of a boundary between the first and the second thermal storage tanks 3 and 4. Additionally, a thermal introduction conduit 7b is formed while penetrating through the second thermal storage tank 4 and the inner tank 5b, and a thermal transport medium 6b having a temperature higher than that of the thermal storage material 2 flows through the thermal introduction conduit 7b. Therefore, thermal exchange takes place between the thermal transport medium 6b flowing through the thermal introduction conduit 7b and the thermal storage material 2 at the portion of the thermal introduction conduit 7b being contacted with the thermal storage material 2. As a result of such thermal exchange, a thermal energy is stored into the thermal storage material 2 from the thermal transport medium 6b. Therefore, a convention of the thermal storage material 2 is induced in the inner tank 5b.

As shown in FIG. 4, both sides of the inner tank 5b along longitudinal sides of the thermal storage portion 1, and the side of the inner tank 5b along the boundary between the first and the second thermal storage tanks 3 and 4 are closed. Therefore, a flow passage 9b for the thermal storage material 2 is formed outside of the aforementioned closed sides of the inner tank 5b of the second thermal storage tank 4. In case the thermal storage material 2 is not convecting outside of the inner tank 5b, the thermal storage material 2 existing in the vicinity of the partition wall 12 functions as a thermal insulating material between the thermal storage material 2 in the inner tank 5b and the thermal storage material 2 in the first thermal storage tank 3.

When the heat is exchanged between the thermal storage material 2 in the inner tank 5b and the thermal transport medium 6b flowing through the thermal introduction conduit 7b, the temperature difference of the thermal storage material 2 in the inner tank 5b is thereby widened. As a result, a convection of the thermal storage material 2 in the inner tank 5b extends beyond the inner tank 5b thereby inducing a convection of the thermal storage material 2 outside of the closed sides of the inner tank 5b. In this situation, a thermal exchange takes place between the thermal storage material 2 in the first thermal storage tank 3 and the thermal storage material 2 flowing outside of the inner tank 5b through the partition wall 12, by lowering the temperature of the thermal storage material 2 in the first thermal storage tank 3 lower than that of the thermal storage material 2 in the second thermal storage tank 4. As a result, convection of the thermal storage material 2 is induced in the first thermal storage tank 3. Thus, the thermal storage material 2 convects entirely in the thermal storage portion 1.

The thermal storage device shown in FIG. 4 also comprises a thermal discharge conduit 11, and a thermal discharge medium 10 flows through the thermal discharge conduit 11. For example, in the example shown in FIG. 4, the thermal discharge conduit 11 penetrates through the longitudinal side of the thermal storage portion 1 opposite to the side in which the thermal introduction conduits 7a is situated to enter into the first thermal storage tank 3. In the thermal storage portion 1, the thermal discharge conduit 11 extends from the first thermal storage tank 3 to enter into the inner tank 5b in the second thermal storage tank 4 across the partition wall 12, and penetrates through the side face of the inner tank 5b and the aforementioned longitudinal side of the thermal storage portion 1 to exit from the thermal storage portion 1. Therefore, in the first and the second thermal storage tanks 3 and 4, the thermal discharge medium 10 is contacted with the thermal storage material 2 through the thermal discharge conduit 11 so that the heat is exchanged therebetween.

Figure 5:
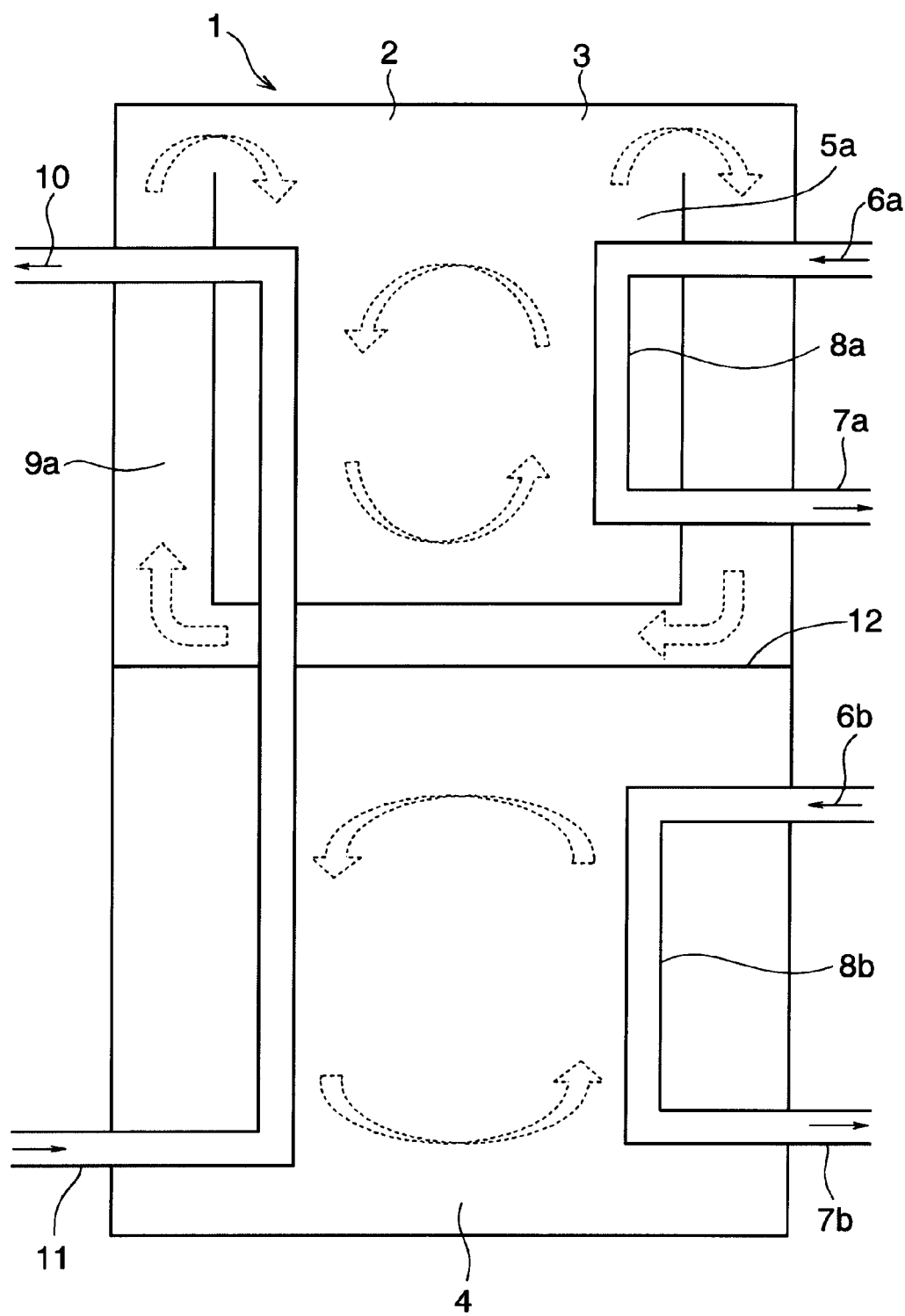
FIG. 5 is a view schematically showing a convection of the thermal storage material in still another example of the thermal storage device having a partition wall.

FIG. 5 is a view schematically showing a convection of the thermal storage material in still another example of the thermal storage device. A liquid thermal storage material 2 is held in a thermal storage portion 1, and an inner space of the thermal storage portion 1 is divided into a first thermal storage tank 3 and a second thermal storage tank 4. Specifically, a partition wall 12 is formed on the boundary between the first and the second thermal storage tanks 3 and 4 to prevent the thermal storage material 2 from flowing across the boundary.

In the first thermal storage tank 3, there is formed an inner tank 5a opening to an opposite side of a boundary between the first and the second thermal storage tanks 3 and 4. Additionally, a thermal introduction conduit 7a is formed while penetrating through the first thermal storage tank 3 and the inner tank 5a. A thermal transport medium 6a having a temperature lower than that of the thermal storage material 2 flows through the thermal introduction conduit 7b. That is, a portion of the thermal introduction conduit 7a being contacted with the thermal storage material 2 functions as the thermal exchange portion 8a. Therefore, thermal exchange takes place between the thermal transport medium 6a flowing through the thermal introduction conduit 7a and the thermal storage material 2. However, in this example, the temperature of the thermal transport medium 6a is lower than that of the thermal storage material 2. That is, a thermal energy of the thermal storage material 2 is absorbed by the thermal transport medium 6a and the thermal storage material 2 is thereby cooled. As a result, convection of the thermal storage material 2 is induced in the inner tank 5a.

As shown in FIG. 5, both sides of the inner tank 5a along longitudinal sides of the thermal storage portion 1, and the side of the inner tank 5a along the boundary between the first and the second thermal storage tanks 3 and 4 are closed. Therefore, a flow passage 9a for the thermal storage material 2 is formed outside of the aforementioned closed sides of the inner tank 5a of the first thermal storage tank 3. In case the thermal storage material 2 is not convecting outside of the inner tank 5a, the thermal storage material 2 existing in the vicinity of the partition wall 12 functions as a thermal insulating material between the thermal storage material 2 in the inner tank 5a and the thermal storage material 2 in the second thermal storage tank 4.

When the thermal exchange takes place between the thermal storage material 2 in the first thermal storage tank 5a and the thermal transport medium 6a flowing through the thermal introduction conduit 7a, the temperature difference of the thermal storage material 2 in the inner tank 5a is thereby widened. As a result, a convection of the thermal storage material 2 in the inner tank 5a extends beyond the inner tank 5a thereby inducing a convection of the thermal storage material 2 outside of the closed sides of the inner tank 5a. Thus, the thermal storage material 2 convects entirely in the first thermal storage tank 3 both inside and outside of the inner tank 5a.

The thermal storage device shown in FIG. 5 also comprises the thermal introduction conduit 7b penetrating through the second thermal storage tank 4, and the portion of the thermal introduction conduit 7b being contacted with the thermal storage material 2 functions as the thermal exchange portion 8b. Therefore, thermal exchange takes place between the thermal transport medium 6b flowing through the thermal introduction conduit 7b and the thermal storage material 2. However, in this example, the temperature of the thermal transport medium 6b is lower than that of the thermal storage material 2. That is, a thermal energy of the thermal storage material 2 is absorbed by the thermal transport medium 6b and the thermal storage material 2 is thereby cooled. As a result, convection of the thermal storage material 2 is induced in the second thermal storage tank 4. In this situation, a thermal exchange takes place between the thermal storage material 2 in the second thermal storage tank 4 and the thermal storage material 2 flowing outside of the inner tank 5a through the partition wall 12, by lowering the temperature of the thermal storage material 2 in the first thermal storage tank 3 lower than that of the thermal storage material 2 in the second thermal storage tank 4. As a result, convection of the thermal storage material 2 is induced in the second thermal storage tank 4. Thus, the thermal storage material 2 convects entirely in the thermal storage portion 1.

The thermal storage device shown in FIG. 5 also comprises a thermal discharge conduit 11, and a thermal discharge medium 10 flows through the thermal discharge conduit 11. For example, in the example shown in FIG. 5, the thermal discharge conduit 11 penetrates through the longitudinal side of the thermal storage portion 1 opposite to the side in which the thermal introduction conduits 7b is situated to enter into the second thermal storage tank 4. In the thermal storage portion 1, the thermal discharge conduit 11 extends from the second thermal storage tank 4 to enter into the inner tank 5a in the first thermal storage tank 3 across the partition wall 12, and penetrates through the side face of the inner tank 5a and the aforementioned longitudinal side of the thermal storage portion 1 to exit from the thermal storage portion 1. Therefore, in the first and the second thermal storage tanks 3 and 4, the thermal discharge medium 10 is contacted with the thermal storage material 2 through the thermal discharge conduit 11 so that the heat is exchanged therebetween.

Figure 6:
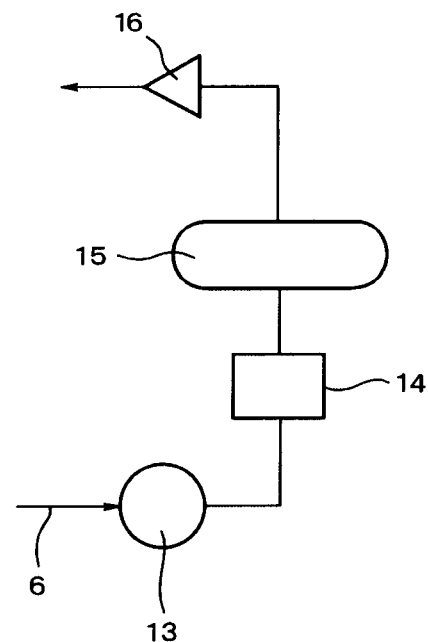
FIG. 6 is a view schematically showing a circulating route of the thermal transport medium of the present invention.

FIG. 6 is a view schematically showing a circulating route of the thermal transport mediums 6a and 6b. As can be seen from FIG. 6, the circulating system comprises a compressor 13 driven by a prime mover (not shown) of a vehicle such as an engine, and a condenser 14, a receiver tank 15 and an expansion valve 16 are connected to a discharging side of the compressor 13 in order. An opening end of the thermal introduction conduit 7a or 7b is connected to a discharging side of the expansion valve 16, and other end of the thermal introduction conduit 7a or 7b is connected to a suction side of the compressor 13.

Figure 7:
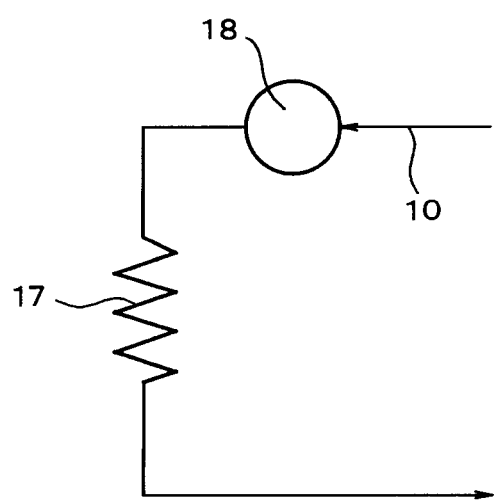
FIG. 7 is a view schematically showing a circulating route of the thermal discharge medium of the present invention.

FIG. 7 is a view schematically showing a circulating route of the thermal discharge medium 10. As can be seen from FIG. 7, a heat exchanger 17 of vehicle interior side and a pump 18 is arranged on the circulating route. An opening end of the thermal discharge conduit 11 is connected to a discharging side of the heat exchanger 17, and other end of the thermal discharge conduit 11 is connected to a suction side of the pump 18.

The invention claimed is:

1. A thermal storage device, which comprises a first thermal transport medium and a second thermal transport medium having different temperatures, a thermal storage material which stores heat of the first and second thermal transport mediums or whose heat is drawn by the first and second thermal transport mediums, the thermal storage device accommodating the thermal storage material, and a first and a second thermal storage tank formed by dividing an inner space of the thermal storage device, and in which a thermal exchange between the first and second thermal transport mediums and the thermal storage material takes place in the first and second thermal storage tanks, comprising:

an inner tank, which is formed entirely within at least one of the first and the second thermal storage tanks, and in which both sides thereof along longitudinal sides of the thermal storage device, and a side thereof along a boundary between the thermal storage tanks are closed, and a side thereof opposite to the boundary between the thermal storage tanks is open such that flow of the thermal storage material is permitted between the inner tank and the at least one of the first and the second thermal storage tanks in which the inner tank is formed;

a first thermal exchange portion, which is formed inside of the inner tank, and in which a thermal exchange takes place between one of the first or second thermal transport mediums and the thermal storage material;

a discharge conduit penetrating the thermal storage tanks, in which a thermal discharge medium flows;

wherein the discharge conduit comprises a second thermal exchange portion at which a thermal exchange takes place between the thermal discharging medium flowing therethrough and the thermal storage material in the thermal storage tanks, and the thermal exchange takes place between the thermal storage material in the first thermal storage tank and the thermal storage material in the second thermal storage tank through a partition wall formed on the boundary between the first and the second thermal storage tanks, the partition wall preventing the thermal storage material from flowing across the boundary.

2. The thermal storage device as set forth in claim 1, further comprising:

a flow passage formed outside of a closed side of the inner tank between the closed side and an inner side of the at least one of the first and the second thermal storage tanks in which the inner tank is formed, through which the thermal storage material flows.

* * * * *